United States Patent
Lee et al.

(10) Patent No.: US 8,292,643 B1
(45) Date of Patent: Oct. 23, 2012

(54) CARD CONNECTOR WITH A HOUSING WITH A GUIDING SLOT ENGAGING A PROTRUDING BLOCK OF A SLIDING DEVICE

(75) Inventors: Yun-Chien Lee, Taoyuan (TW); Te-Hung Yin, Taoyuan (TW)

(73) Assignee: Proconn Technology Co., Ltd., Taoyuan (TW)

( * ) Notice: Subject to any disclaimer, the term of this patent is extended or adjusted under 35 U.S.C. 154(b) by 0 days.

(21) Appl. No.: 13/206,515

(22) Filed: Aug. 10, 2011

(51) Int. Cl.
*H01R 13/62* (2006.01)
(52) U.S. Cl. ........................................ 439/159
(58) Field of Classification Search .......... 439/157–160, 439/630, 352
See application file for complete search history.

(56) References Cited

U.S. PATENT DOCUMENTS

| | | | |
|---|---|---|---|
| 7,628,653 B2 * | 12/2009 | Zhang et al. | 439/630 |
| 2005/0221649 A1 * | 10/2005 | Tanaka et al. | 439/159 |
| 2009/0061674 A1 * | 3/2009 | Lai | 439/352 |
| 2010/0093200 A1 * | 4/2010 | Ye et al. | 439/159 |
| 2011/0053396 A1 * | 3/2011 | Zhou et al. | 439/188 |

* cited by examiner

*Primary Examiner* — Chandrika Prasad
(74) *Attorney, Agent, or Firm* — Lin & Associates IP, Inc.

(57) ABSTRACT

A card connector includes an insulating housing defining a receiving chamber, a sliding recess and a guiding slot opened in a bottom of the sliding recess and having a front spread towards the receiving chamber to define a guiding slope. An ejecting device includes a slider slidably disposed in the sliding recess, an elastic element clipped between the slider and the sliding recess and a connecting bar having one end fastened in the insulating housing and the other end slidably located in the slider. A front of the slider protrudes sideward to form a holding projection. A block is protruded on a bottom of the slider and received in the guiding slot for cooperating with the guiding slope to guide the movement of the slider so as to make the holding projection tightly buckled in a gap of a card for securing the card in the receiving chamber.

6 Claims, 5 Drawing Sheets

_US 8,292,643 B1_

CARD CONNECTOR WITH A HOUSING WITH A GUIDING SLOT ENGAGING A PROTRUDING BLOCK OF A SLIDING DEVICE

BACKGROUND OF THE INVENTION

1. Field of the Invention

The present invention generally relates to a card connector for receiving a card therein, and more particularly to a card connector capable of preventing the card from springing out in the process of inserting and ejecting the card.

2. The Related Art

Traditionally, a card connector has an ejecting device used for ejecting an external card from the card connector. The ejecting device includes a slider, a spring and a connecting bar. While the card is inserted into the card connector, the card pushes the slider to move. Then the spring is compressed and the connecting bar jostles the slider to keep the slider and the spring relatively immovable. While the card is withdrawn from the card connector, the card is again pushed inward to make the slider discharged from the connecting bar. As a result, the power stored in the spring is released so that drives the spring to reposition and further drives the slider to reposition. So the slider ejects the card to exit from the card connector.

However, in the process of inserting and ejecting the card, the card is apt to spring out from the card connector without any holding structures for cushioning the speed of the card moving outward under the action of the ejecting device. As a result, the card may be lost or damaged.

SUMMARY OF THE INVENTION

An object of the present invention is to provide a card connector adapted for receiving an external card having a gap at one side edge thereof. The card connector includes an insulating housing defining a receiving chamber penetrating through a top and a front thereof for receiving the card therein. One side of the receiving chamber defines a sliding recess of which a bottom wall defines a guiding slot extending along an insertion direction of the card. A front of the guiding slot further spreads towards the receiving chamber to accordingly form a guiding slope. A plurality of terminals is disposed in the insulating housing and stretches into the receiving chamber for electrically contacting the card. An ejecting device used for ejecting the card out of the card connector includes a slider slidably disposed in the sliding recess, an elastic element elastically clipped between the slider and a rear wall of the sliding recess, and a connecting bar of which one end is fastened in a front end of the insulating housing and the other end is slidably located in the slider. A front end of the slider protrudes toward the receiving chamber to form a holding projection buckled into the gap of the card for securing the card. A block is protruded on a bottom side of the slider and received in the guiding slot for further cooperating with the guiding slope to make the front end of the slider capable of being biased outward for the convenience of the holding projection being buckled into the gap of the card in the process of inserting the card, and guide the slider to move close to the card to strengthen an interference of the holding projection and the gap in the process of ejecting the card.

As described above, the card connector of the present invention utilizes the cooperation of the guiding slot, the guiding slope of the insulating housing and the block of the slider to make the holding projection easily buckled into the gap of the card in the process of inserting the card, and make the slider move close to the card to strengthen an interference of the holding projection and the gap in the process of withdrawing the card, so that effectively prevent the card from springing out of the card connector unexpectedly while inserting and ejecting the card.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 2:
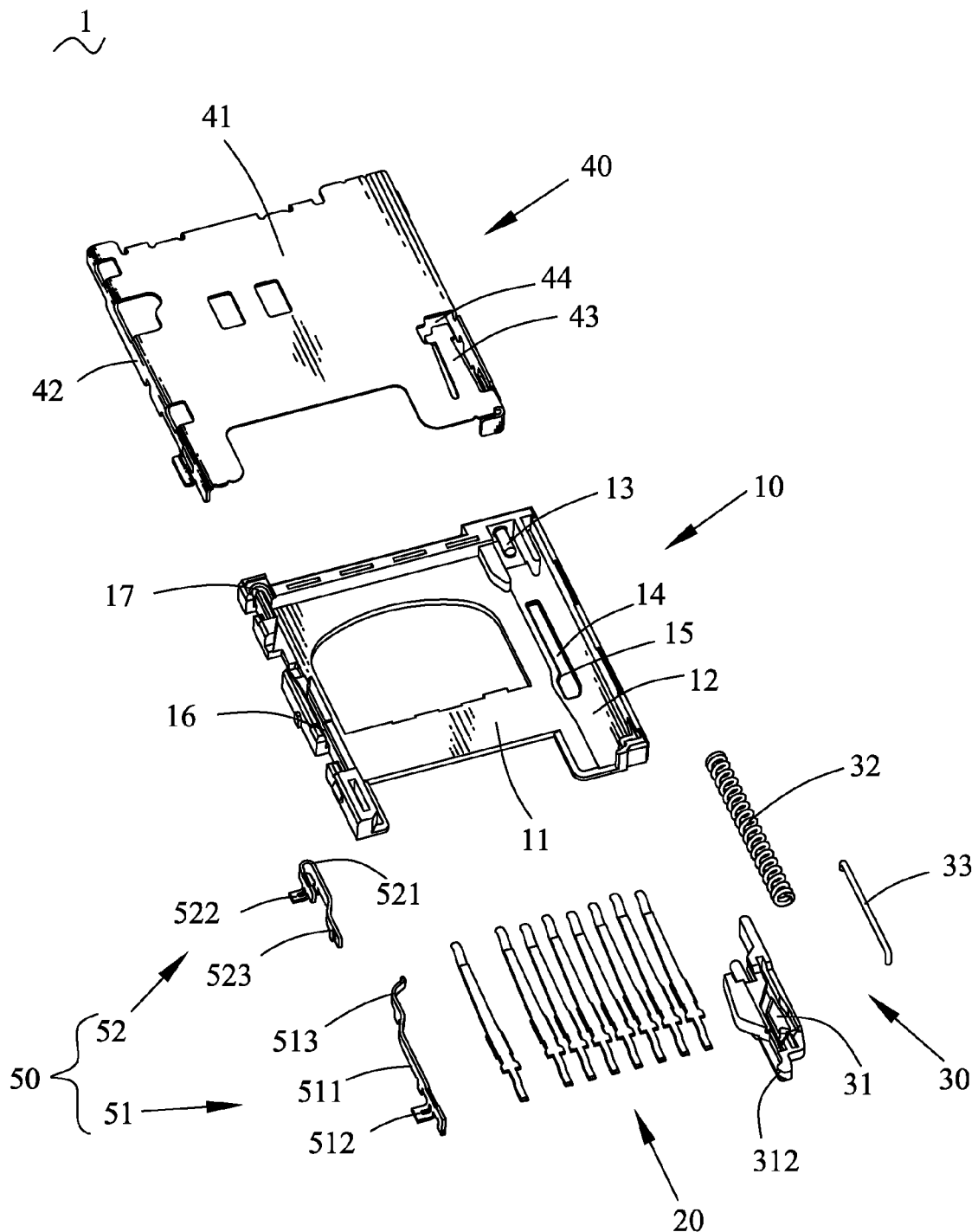
FIG. 2 is an exploded perspective view of the card connector of FIG. 1.
Figure 3:
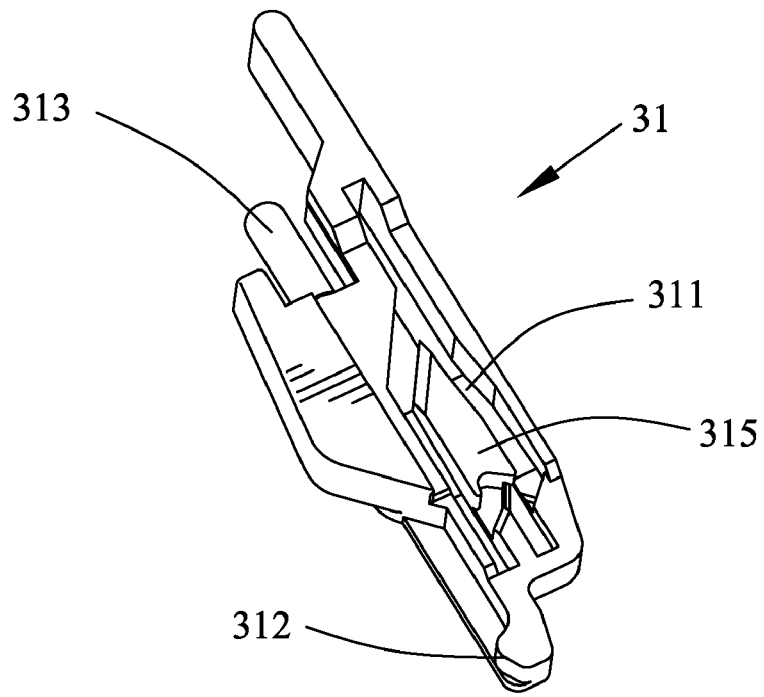
FIG. 3 is a perspective view of a slider of the card connector of FIG. 2.
Figure 4:
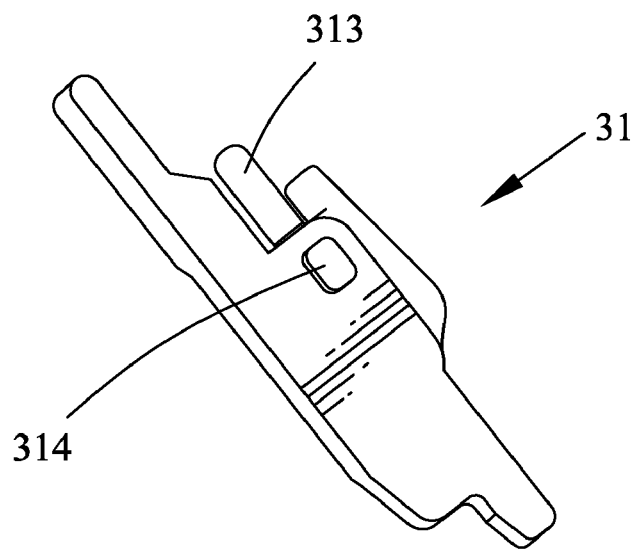
FIG. 4 is another perspective view of the slider of FIG. 3.
Figure 6:
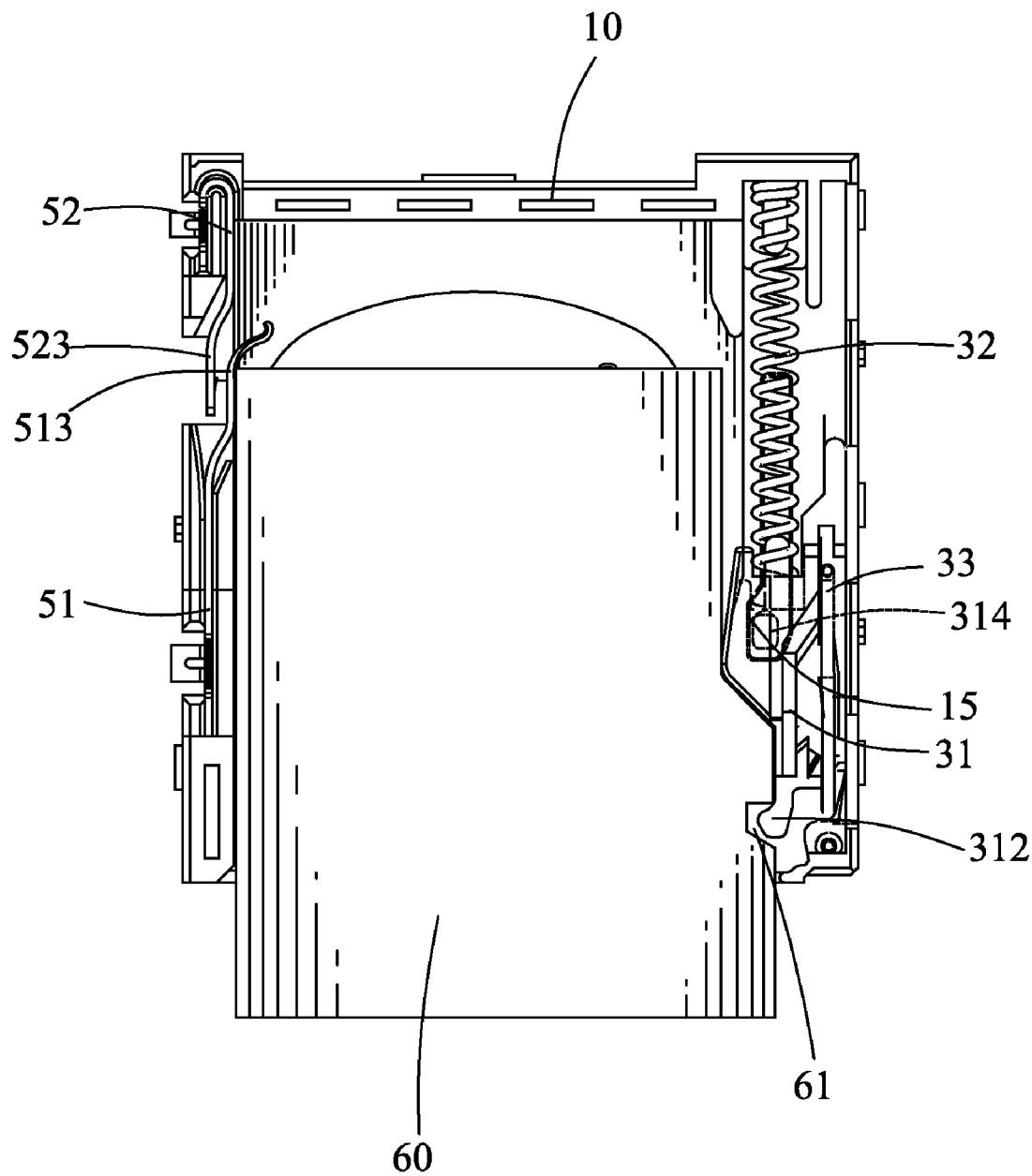
FIG. 6 is a perspective view showing that a card is inserted in the card connector of FIG. 1 except the cover.

With reference to FIG. 2 and FIG. 6, a card connector 1 adapted for receiving a card 60 therein includes an insulating housing 10, a plurality of terminals 20, an ejecting device 30, a cover 40 and a switch terminal assembly 50.

In FIG. 2 and FIG. 6, the insulating housing 10 is of a substantial rectangular shape and defines a rectangular receiving chamber 11 penetrating through a top and a front thereof for receiving the card 60 therein. One side of the receiving chamber 11 is further concaved downward to form a sliding recess 12 extending along an insertion direction of the card 60 and adjacent to one side wall of the receiving chamber 11. A rear wall of the sliding recess 12 protrudes forward to form a retaining rod 13. A bottom wall of the sliding recess 12 defines a guiding slot 14 extending along the insertion direction of the card 60. A front of the guiding slot 14 is further spread towards the receiving chamber 11 to accordingly form a guiding slope 15 inclined gradually away from the receiving chamber 11 from front to rear. The other side wall of the receiving chamber 11 defines a first fastening fillister 16 in a substantial middle thereof and a second fastening fillister 17 in a rear thereof, wherein a front end of the second fastening fillister 17 and a rear end of the first fastening fillister 16 are communicated with each other and further connected with the receiving chamber 11.

Figure 5:
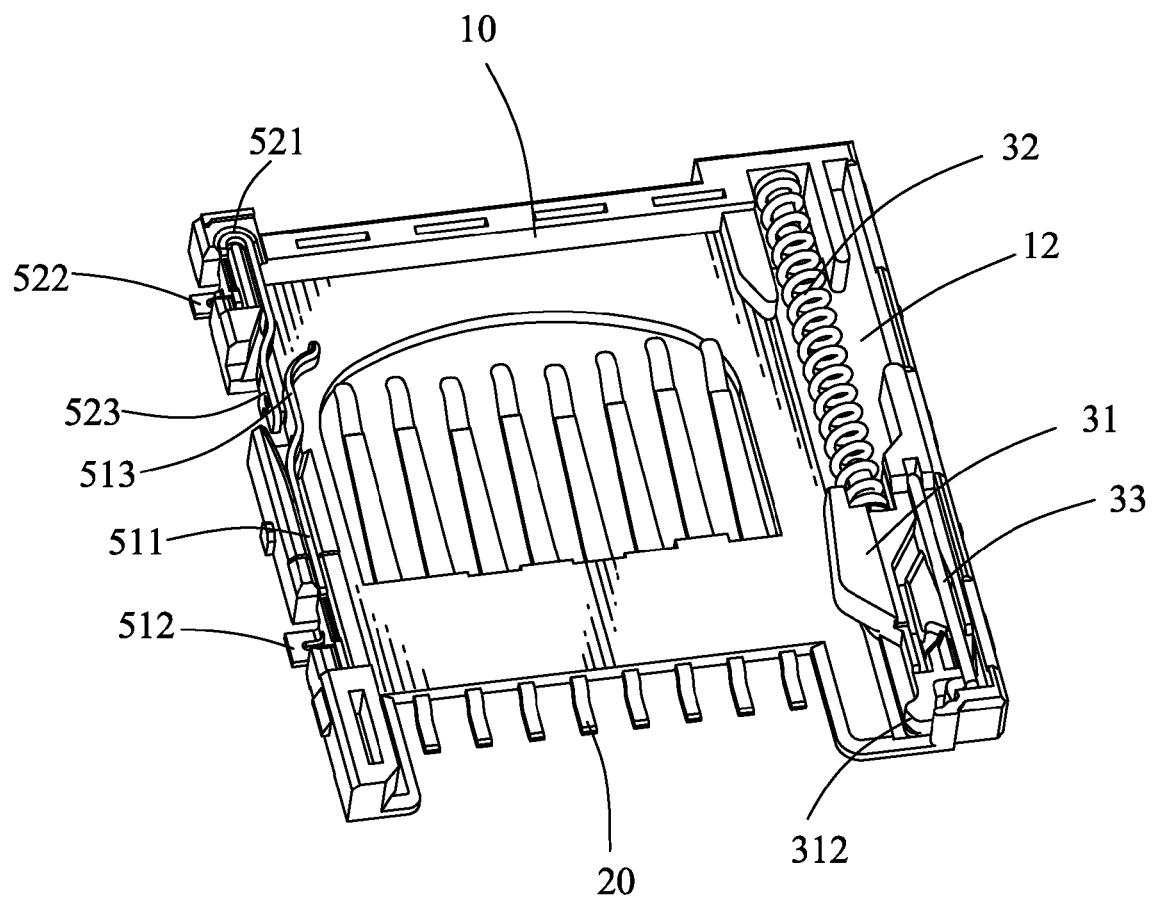
FIG. 5 is an assembled perspective view of the card connector of FIG. 1 except a cover.

Referring to FIG. 5 and FIG. 6, the terminals 20 are molded in a front of a bottom wall of the receiving chamber 11 of the insulating housing 10 at regular intervals along a transverse direction of the insulating housing 10, and further stretch into the receiving chamber 11 for electrically contacting with the card 60.

Referring to FIGS. 2-5, the ejecting device 30 includes a slider 31, an elastic element and a connecting bar 33. In this embodiment, the elastic element is a spring 32. The slider 31 defines a trace cavity 311 at a top thereof. A trace shoulder 315 is defined in the trace cavity 311 and located apart from a periphery inside of the trace cavity 311. One side of a front end of the slider 31 protrudes forward and then sideward to form a holding projection 312. A rear end of the slider 31 protrudes rearward to form a positioning rod 313. A block 314 is protruded downward on a bottom side of the slider 31. The slider 31 is movably disposed in the sliding recess 12 of the insulating housing 10, with the holding projection 312 facing the receiving chamber 11, and the block 314 being slidably received in the guiding slot 14. One end of the spring 32 is worn around the retaining rod 13 of the insulating housing 10 and the other end thereof is worn around the positioning rod 313 of the slider 31. One end of the connecting bar 33 is fastened in a front end of the sliding recess 12, and the other end thereof is slidably located in the trace cavity 311 of the slider 31 for collaborating with the trace shoulder 315 to realize insertion and ejection of the card 60.

Referring to FIG. 2 and FIG. 5, the switch terminal assembly 50 includes a first switch terminal 51, and a second switch terminal 52. The first switch terminal 51 has a long first base strip 511 fastened in the first fastening fillister 16 of the insulating housing 10, a first soldering tail 512 bent sideward from a front of a bottom edge of the first base strip 511 to be projected under the insulating housing 10, and a curved contact arm 513 extending rearward from a rear end of the first base strip 511 to further stretch sideward into the receiving chamber 11. The second switch terminal 52 has a U-shaped second base strip 521 fastened in the second fastening fillister 17, a second soldering tail 522 bent sideward from a bottom edge of an outer arm of the second base strip 521 to be projected under the insulating housing 10, and a contact portion 523 curvedly extending forward from a front end of an inner arm of the second base strip 521 to be apart located at one side of the contact arm 513 opposite to the receiving chamber 11.

Figure 1:
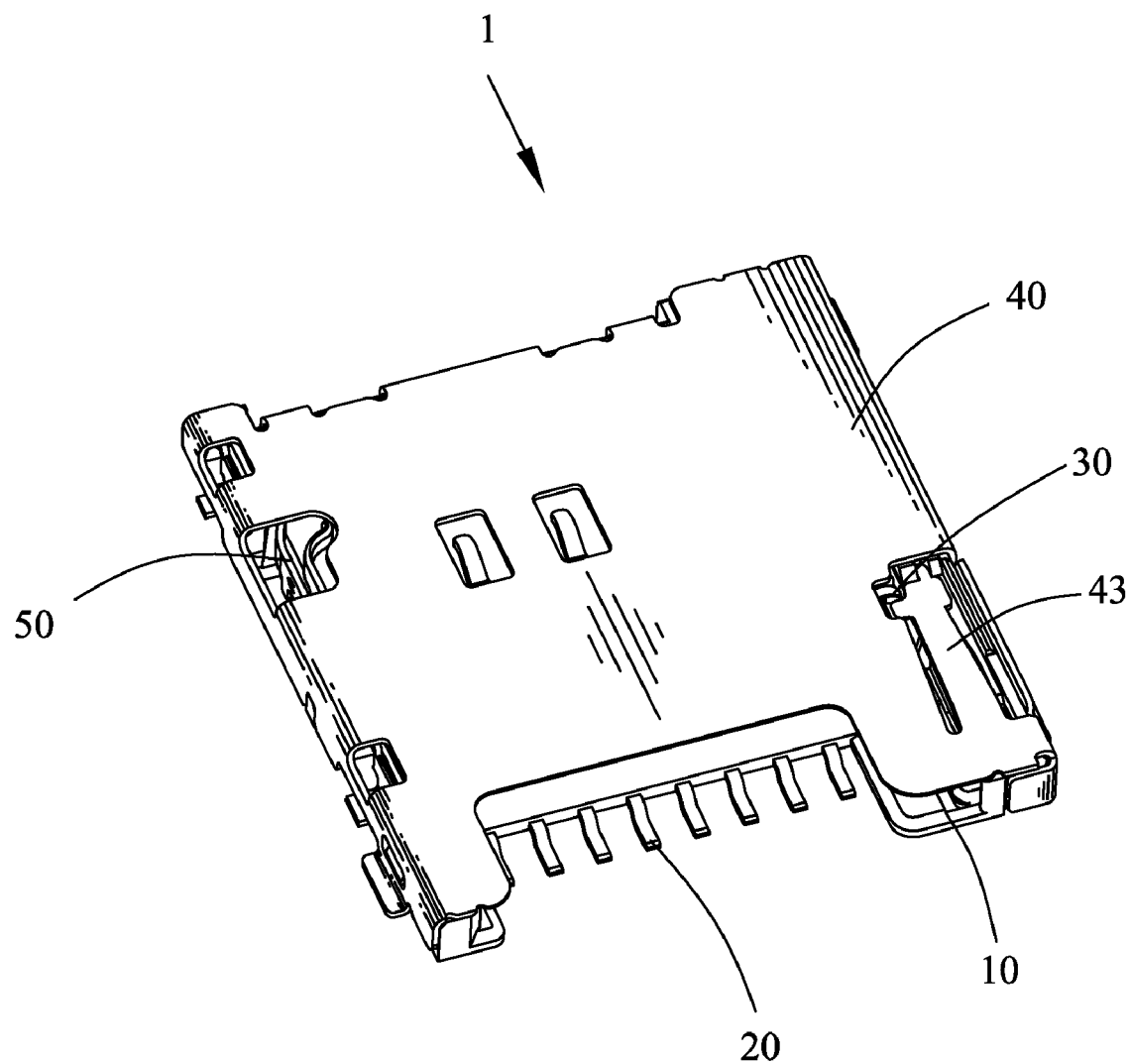
FIG. 1 is an assembled perspective view of a card connector according to an embodiment of the present invention.

Referring to FIG. 1 and FIG. 2, the cover 40 is coupled on the insulating housing 10, and has a rectangular base plate 41 covered on the receiving chamber 11 and two side plates 42 which are bent downward from both opposite side edges of the base plate 41. One side of a front of the base plate 41 defines an opening 44 above the ejecting device 30. A front edge of the opening 44 extends rearward and is inclined downward to form a restraining slice 43 resisting against the connecting bar 33 for restraining the connecting bar 33 to steadily slide in the trace cavity 311 of the slider 31.

Referring to FIG. 1 and FIG. 6, in the process of the card 60 which has a gap 61 at one side edge thereof being inserted into the receiving chamber 11 of the card connector 1, a front of the slider 31 is biased outward by the card 60 by virtue of the position of the block 314 located in the front of the guiding slot 14, for the convenience of the holding projection 312 being buckled into the gap 61 so as to hold the card 60 in the receiving chamber 11 and prevent the card 60 from springing out of the card connector 1 during the insertion of the card 60. Then, the movement of the card 60 drives the slider 31 to slide along the sliding recess 12 under the guidance of the guiding slot 14 and the block 314 that makes the spring 32 compressed and the connecting bar 33 move along the trace cavity 311. When the card 60 is fully inserted in the receiving chamber 11, the connecting bar 33 is blocked by the trace shoulder 315 in the trace cavity 311 to make the card 60 steadily received in the card connector 1 and realize a steady connection between the card 60 and the terminals 20. At this time, the contact arm 513 of the first switch terminal 51 is pressed sideward by the card 60 to electrically contact with the contact portion 523 of the second switch terminal 52 so as to realize a switch function.

When the card 60 is withdrawn from the card connector 1, the card 60 obtains a rearward push force again until the connecting bar 33 departs from the trace shoulder 315 of the slider 31 and re-slides into the trace cavity 311. At this moment, the power stored in the spring 32 is released that pushes the slider 31 to move forward under the guidance of the guiding slot 14 and the block 314 and further pushed the card 60 to move forward. After the block 314 slides through the guiding slope 15, the slider 31 moves close to the card 60 to realize a strong hold of the holding projection 312 and the gap 61 so as to prevent the card 60 from springing out unexpectedly by the ejecting device 30.

As described above, the card connector 1 of the present invention utilizes the cooperation of the guiding slot 14, the guiding slope 15 of the insulating housing 10 and the block 314 of the slider 31 to make the holding projection 312 easily buckled into the gap 61 of the card 60 in the process of inserting the card 60, and make the slider 31 move close to the card 60 to strengthen an interference of the holding projection 312 and the gap 61 in the process of withdrawing the card 60, so that effectively prevent the card 60 from springing out of the card connector 1 unexpectedly while inserting and ejecting the card 60.

What is claimed is:

1. A card connector adapted for receiving an external card having a gap at one side edge thereof, comprising:
    an insulating housing defining a receiving chamber penetrating through a top and a front thereof for receiving the card therein, one side of the receiving chamber defining a sliding recess of which a bottom wall defines a guiding slot extending along an insertion direction of the card, a front of the guiding slot further spreading towards the receiving chamber to accordingly form a guiding slope;
    a plurality of terminals disposed in the insulating housing and stretching into the receiving chamber for electrically contacting the card;
    an ejecting device used for ejecting the card out of the card connector and including a slider slidably disposed in the sliding recess, an elastic element elastically clipped between the slider and a rear wall of the sliding recess, and a connecting bar of which one end is fastened in a front end of the insulating housing and the other end is slidably located in the slider, a front end of the slider protruding toward the receiving chamber to form a holding projection buckled into the gap of the card for securing the card, a block being protruded on a bottom side of the slider and received in the guiding slot for further cooperating with the guiding slope to make the front end of the slider capable of being biased outward for the convenience of the holding projection being buckled into the gap of the card in the process of inserting the card, and guide the slider to move close to the card to strengthen an interference of the holding projection and the gap in the process of ejecting the card; and
    a cover coupled on the insulating housing.

2. The card connector as claimed in claim 1, further comprising a first switch terminal which has a first base strip fastened in a substantial middle of one side wall of the receiving chamber far away from the sliding recess and a contact arm extending rearward from a rear end of the first base strip to further stretch sideward into the receiving chamber, and a second switch terminal which has a U-shaped second base strip fastened in a rear of the one side wall of the receiving chamber and a contact portion curvedly extending forward from one front end of the second base strip to be apart located at one side of the contact arm opposite to the receiving chamber, the contact arm electrically contacts with the contact portion under the pressure of the card.

3. The card connector as claimed in claim 2, wherein a bottom edge of the first base strip is bent sideward to form a first soldering tail projected under the insulating housing, and a bottom edge of the second base strip is bent sideward to form a second soldering tail projected under the insulating housing.

4. The card connector as claimed in claim 1, wherein the cover has a base plate covered on the receiving chamber and two side plates bent downward from both opposite side edges of the base plate, one side of a front of the base plate defines an opening above the ejecting device, a front edge of the opening extends rearward and is inclined downward to form a restraining slice resisting against the connecting bar for restraining the connecting bar to steadily slide in the slider.

5. The card connector as claimed in claim 1, wherein the rear wall of the sliding recess protrudes forward to form a retaining rod, a rear end of the slider protrudes rearward to form a positioning rod, one end of the elastic element is worn around the retaining rod and the other end thereof is worn around the positioning rod.

6. The card connector as claimed in claim 5, wherein the slider defines a trace cavity in a top thereof, the other end of the connecting bar is slidably located in the trace cavity of the slider.

\* \* \* \* \*